Jan. 24, 1961     M. B. SCHER     2,968,869
PREPARATION OF MAPS
Filed Nov. 30, 1956     2 Sheets-Sheet 1
FIGURE 2
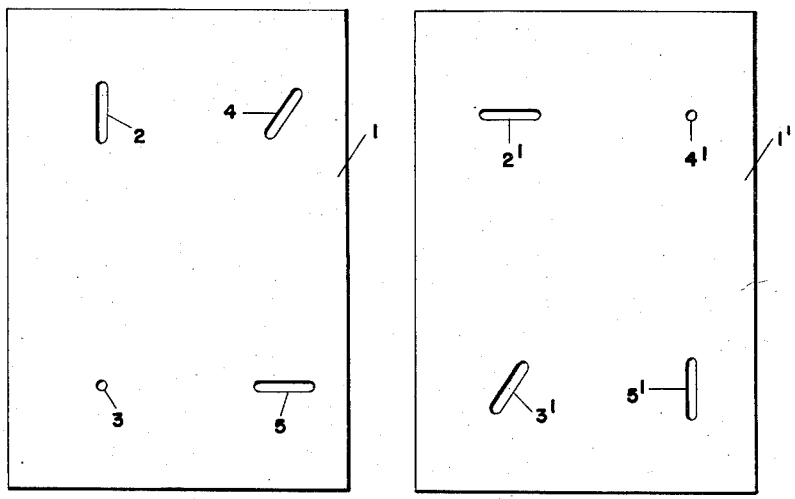
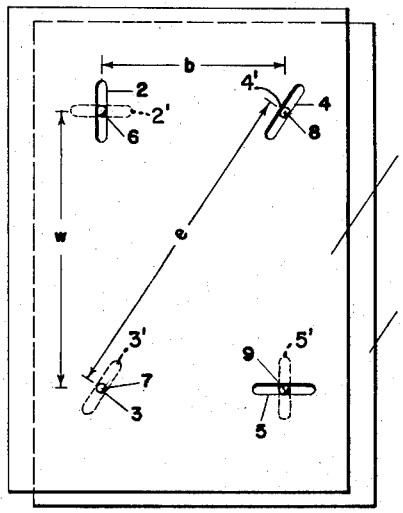
FIGURE 1
INVENTOR.
MARVIN B. SCHER
BY
ATTORNEY Jan. 24, 1961  M. B. SCHER  2,968,869
PREPARATION OF MAPS
Filed Nov. 30, 1956  2 Sheets-Sheet 2
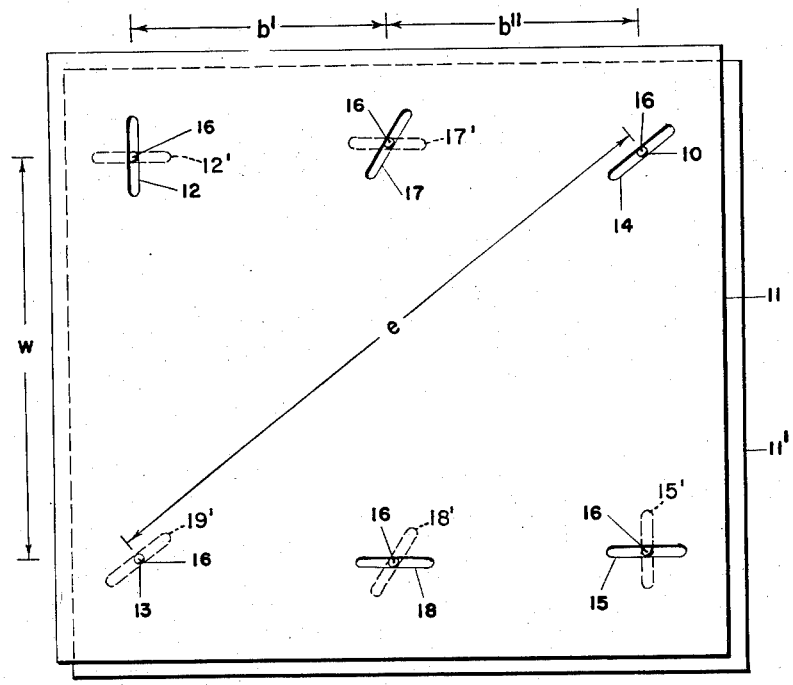
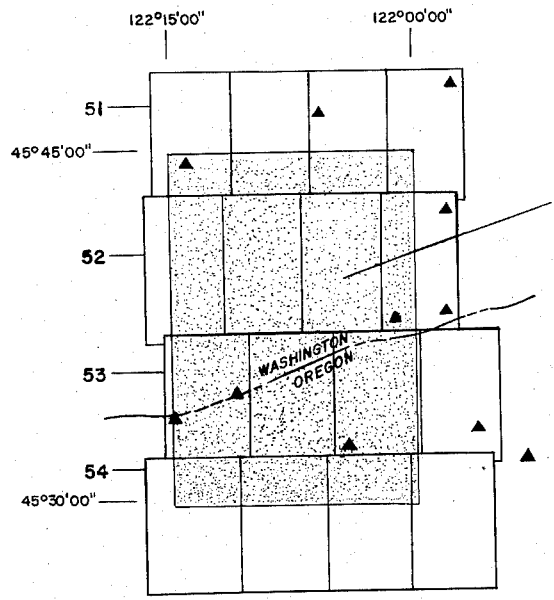
FIGURE 4
▲ Horizontal Control Points
INVENTOR.
MARVIN B. SCHER
BY
ATTORNEY.

United States Patent Office 2,968,869
Patented Jan. 24, 1961

2,968,869

PREPARATION OF MAPS

Marvin B. Scher, Silver Spring, Md., assignor to the United States of America as represented by the Secretary of the Interior Filed Nov. 30, 1956, Ser. No. 625,557

6 Claims. (Cl. 33—1)

(Granted under Title 35, U.S. Code (1952), sec. 266)

The invention herein described and claimed may be manufactured and used by or for the Government of the United States for governmental purposes without the payment of royalties thereon or therefor (35 U.S.C., sec. 266).

This invention relates to the preparation of maps, more especially to photogrammetric mapping procedures based upon aerial photography.

It is an object of the invention to provide a system for achieving the satisfactory scale solutions in photogrammetric mapping procedures which require less horizontal control positions than in systems heretofore used.

Another object of my invention is to reduce the cost and time of preparation of satisfactory maps.

These and other objects will be apparent from the following description.

Various systems have been proposed, and some are in actual use, for preparation of maps from aerial photographs. Detailed descriptions of these systems may be found in the "Manual of Photogrammetry" (1952 edition) published by the American Society of Photogrammetry, Washington, D.C.

In one of these systems, optical reconstruction of natural terrain features, in three dimensions, is effected by means of stereoscopic plotting instruments. In the simplest form, a diapositive, or projection transparency, is prepared from each of two successive photographs made on a given flight over the area to be mapped. As is well known, such photographs "overlap," that is a portion of each covers the same terrain but from different angles of view. The images of one of these diapositives is projected by blue-green light upon the viewing or plotting surface and the other projected by red light. The angles of projection are adjusted so that the images coincide for the overlapping or common portion of the terrain, thereby reproducing angles at which the original photographs were taken. By adjustment of the planes of the individual diapositives, the resulting anaglyph is corrected for "tilt" in the corresponding original photographs.

When viewed through a pair of suitably colored filters the anaglyph appears as a three dimensional view, or optical model, of the terrain being mapped. The scale of this model is known only approximately from the altitude and other data of the flight in which the photographs were taken. In order to convert the information represented by the optical model to terms applicable to the finished map, it is necessary to convert the unknown or random scale of the model to a fixed or predetermined scale.

Where the single model includes two or more horizontal control points this presents no special difficulty as it is only necessary, by means of the adjustments provided in the instrument itself, to enlarge or decrease the size of the model to the desired scale.

However, where the control points are so separated that they cannot be included in any one model, recourse must be had to other methods for converting the random scale of a given model to the predetermined scale. One of these, the so-called "bridging" method, involves the simultaneous creation of a plurality of optical models based upon a continuous series of photographs covering a strip of terrain which includes two or more of the control points. The several models are separately adjusted by trial and error until the distance between the control points in the resulting composite model is brought to the predetermined scale.

This method is satisfactory only where a given flight, and the resulting series of overlapping photographs, covers a strip of terrain including a plurality of control points, one of which is preferably located approximately at the edge of the area to be mapped and another preferably at the opposite edge of said area. Unfortunately, it is not always possible to include in each flight strip the desired number and location of control points. Such a deficiency in control points in a given strip, in the conventional stereoscopic procedures, requires supplemental data based upon direct measurements in the field or computed from other available data.

The determination by field surveying methods of a sufficient number of geographic positions to meet all the needs of all the individual models of an area to be mapped is too costly to be considered practicable in many cases. Moreover, especially in remote, sparsely settled, or relatively inaccessible areas, it is not always possible to secure by on-the-ground surveys, all the information required.

Under these circumstances, it is the accepted practice to establish in the field a minimum number of positions from which the remainder of the required positions may be computed by conventional photogrammetric means, such as stereo-triangulation, "scaling," or "bridging." The field established positions are referred to as "horizontal control," whereas the positions determined by photogrammetry are designated "pass points."

By my invention, however, I have found it possible to secure accurate and satisfactory scale solutions for the mapping of remote, inaccessible areas for which as few as three horizontal control points are available. While additional horizontal control points are desirable and may be used, they are not necessary for the practice of my invention. Such additional control points serve primarily to facilitate the preparation of the area solution and to check the accuracy thereof. Accordingly, it should be understood that my invention is not limited to situations in which there are an insufficient number of control points to permit mapping by conventional procedures, but that it is of general application.

My invention, broadly, contemplates the preparation of a stereotemplet for a given number of the stereoscopic models of the terrain forming part of the area being mapped.

A stereotemplet is defined as a composite slotted templet mechanically representing the horizontal plot of a stereoscopic model. It is specifically designed for use in connection with stereoscopic plotting instruments and while retaining the advantages of stereoplotting techniques, greatly extends the applicability thereof. This method combines the precision and geometric strength of the stereoplotting technique with the favorable area solution provided by a templet system. The templets may be made of any flat and rigid sheet material having sufficient strength and stability to resist deformation due to mechanical stresses and moisture changes. I have found hard pressed cardboard about .03" in thickness to be satisfactory for this purpose. However, various sheet plastics and thin metal sheets of steel, aluminum and the like may also be used.

In the preparation of maps from aerial photographs slotted templets have heretofore been used. Examples of such templets and their method of preparation and use are found in Collier Patent No. 2,102,612 and Eliel Patent No. 2,180,406. Such a templet is representative of a single photograph and one of its functions is the rectification of image displacements due to relief and tilt. This monoscopic consideration requires all slots to be cut radially from a point at or near the center of the templet.

The stereotemplets prepared according to my invention, however, do not include such rectification function, and it is not necessary to locate and punch center or principal points as in the conventional templet system. The resulting design, accordingly, is stronger and more accurate.

In the drawings:

Figure 1 shows a stereotemplet of a given optical model prepared in accordance with my invention.

Figure 2 is an exploded view of the stereotemplet of Figure 1 showing the two sheets of which it is formed.

Figure 3 shows a stereotemplet for two adjacent optical models.

Figure 4 shows more or less diagrammatically the assembly of my stereotemplets to the scale solution of an area embracing a 15 minute quadrangle.

Figure 1 shows a stereotemplet of a given model prepared in accordance with my invention. This consists of two sheets of cardboard, or other suitable templet material, 1 and 1', each of which contains a minimum of four plotted positions or pass-points, representing image points in each of the four corners of the respective neat stereoscopic model. Studs 6, 7, 8, and 9, representing the model image points, are placed through the holes and/or slots. The distance b, between the studs 6 and 8, represents the air base of the stereoscopic model from which the stereotemplet is plotted. The distance, w, between studs 6 and 7 represents the width of said model. The distance, e, between studs 7 and 8 is the expansion base of the stereotemplet.

Figure 2 illustrates the sheets, 1 and 1', after the positions have been plotted but before assembly of the stereotemplet shown in Figure 1. In sheet 1, a hole has been punched at position 3, while slots radially aligned with said hole have been cut or punched at positions 2, 4, and 5. In sheet 1', the hole has been punched at position 4', while the slots have been cut or punched at positions 2', 3' and 5'. These slots, of course, are radially aligned with the hole at position 4'.

As explained more fully below, in addition to the four predetermined pass point positions, a stereotemplet may include horizontal control points and, if desired, additional pass points. Radially aligned slots will also be cut or punched in the templet sheets for such additional points.

It will be apparent from Figures 1 and 2 that as the studs 7 and 8 of the stereotemplet are moved towards each other, or vice versa, sheets 1 and 1' will likewise be moved or displaced with respect to each other.

Referring to Figure 1, the scale of the stereotemplet is increased as the studs 7 and 8 are moved apart along the expansion base, e. The resulting displacement of sheets 1 and 1' shifts the position of slots 2 and 5 with respect to slots 2' and 5', thereby causing a corresponding and proportional movement of studs 6 and 9. Conversely, by moving the studs 7 and 8 towards each other, so as to shorten the expansion base, e, therebetween, the other studs 6 and 9 will move a proper portional amount to satisfy the scale change thereby imparted to the stereotemplet. The angular relation between the several points on the stereotemplet is unchanged by such changes in scale.

In Figure 3 there is shown a stereotemplet prepared to represent the horizontal plot of two successive optical models as a single unit. Such a multiple-model stereotemplet requires the use of a stereoscopic plotter such as the "Multiplex," capable of orienting a plurality of successive models at a uniform scale. The plotting of such multiple model stereotemplets is substantially like that for single model stereotemplets. There are, of course, but two radial centers for any given stereotemplet, regardless of the number of models represented thereby. In Figure 3, the upper and lower templet sheets or elements are designated 11 and 11', respectively. One radial center of the two bridged models is designated 13, corresponding to the selected pass point in the lower left hand corner of the first model, and the other radial center is designated 10, corresponding to the selected pass point at the upper right hand corner of the second model. The slots 14, 12, 15, 17, and 18, in the top or upper element 11, shown in solid lines, are radially aligned with radial center 13. The corresponding slots 12', 15', 17', 18', and 19' in the lower element 11', shown in dotted lines, are aligned with the radial center 10 of this element. For clarity, as in Figure 1, the numerical designations of the slots in the lower element are omitted. Position indicating studs 16, are placed through the overlapping holes and/or slots.

In this multiple unit stereotemplet, the effective air base dimension is the sum of the air base b' of the first, or left hand, model and the air base b'' of the second, or right hand, model, that is the distance between the studs in slot 12 and radial center 10. The stud in intermediate slot 17 represents a pass point common to the two models. The width of the models is the distance w between the stud in slot 12 and that in radial center 13. The expansion base of this stereotemplet is the distance e between the studs at the radial centers, 10 and 13. The remaining stud, shown in slot 18, represents the lower common pass point.

Figure 4 shows an assembly of sixteen stereotemplets representing four flights of four models each. The flights are designated from top to bottom by the numerals 51, 52, 53, and 54. The horizontal control points plotted on the respective stereotemplets are indicated by the triangles. This assembly, as explained more fully below, is placed over a sheet of suitable material (not shown) upon the conventional base or mounting board (also not shown) for compilation purposes. The several stereotemplets in strip 51 for example, may be assembled first to connect the several control points included in this flight. The stereotemplets in strip 52 are then assembled to connect the several control points in this flight and also with the templets of strip 51. The other strips, 53 and 54, are similarly assembled and connected with the respective controls and adjoining strips.

In practicing my invention, the potential data required for preparation of a given stereotemplet may be plotted by use of any stereoplotting instrument capable of forming a geometrically faithful optical model. Positions of image points plotted orthographically from leveled models are corrected with respect to tilt and have no horizontal displacement due to relief. Consequently, the positional data furnished to the stereotemplet is at a random but uniform scale. The stereotemplet prepared from these data, as set forth more fully below, functions so as to maintain this scale relationship between points plotted from the model while permitting an increase or decrease in the over-all scale of the stereotemplet. When all the stereotemplets for a given area are assembled to satisfy the horizontal control positions, each is thereby adjusted to a predetermined common scale.

In preparing a stereotemplet, an optical model of a portion of the terrain to be mapped is formed in the usual manner, from diapositives set up in any suitable stereoscopic plotting instrument and the model is leveled to the tolerance necessary to maintain the proper planimetric relationships of positions plotted orthographically from the model. In practice, a tolerance of from 0.5 to 1.0 mm. is usually sufficient for this purpose. Examples of suitable stereo-plotters are shown and described in the Kelsh Patents Nos. 2,451,031 and 2,727,432, and the Bean Patents Nos. 2,696,752 and 2,737,846.

From this model all relevant horizontal control and predetermined pass points positions are plotted onto a templet blank. Where the scale of the model approximates the scale established for the ultimate assembly of stereotemplets, the stereotemplet may be plotted directly from the model. The scale of the stereotemplet may be varied from that of the model by use of a pantograph if desired. In any event, my invention does not require that all the stereotemplets for a given area be at exactly the same scale, and hence it is not necessary to determine the actual scale for each model or the stereotemplet prepared therefrom. Considerable variation of the several stereotemplets for the area is acceptable in most applications, but it is desirable that these be approximately the same scale. Accuracy and ease of assembly are improved as the random scale for each templet more closely approaches the predetermined scale for the assembly. The scale of the assembly preferably is equal to or greater than the predetermined compilation scale.

The plotted positions are pricked through the templet to another blank so as to provide a duplicate. There are at least four such positions in each pair of templets, representing four image points in the corresponding stereoscopic model. In order to give the maximum expansion base to the stereotemplet, the four positions should be spaced as far apart as practicable, preferably in the form of a rectangle. These positions, designated "pass points," are the four corners of the optical model.

At one of these positions or corners, a stud-receiving hole is punched, and slots radially aligned therewith are cut at the other positions. The diameter of the hole and the width of the slots should be just large enough to provide a snug fit for the stud without binding. I prefer to use studs or posts of the type and size generally used in mapping procedures to locate selected points but do not wish to be limited thereto. A slot length of about two inches is usually sufficient for most purposes. A single templet so prepared is designated 1, in Figure 2.

In the second, or duplicate, templet of the pair, the stud receiving hole is punched at the position of the pass point representing the diagonally opposite corner of the model. Slots containing the positions of all other points are then cut radially from this hole. In Figure 2, this duplicate templet is shown at 1'.

The thus prepared templets are oriented and arranged so that the plotted positions coincide, with a stud representing each of the image points placed through the holes and/or slots, as shown in Figure 1. The resulting composite is a stereotemplet. While all of the stereotemplets so prepared are at a random scale, as explained above, the scale of the stereotemplet may be varied within limits by the length of the slots.

In varying the scale, the studs at the two radial centers are moved the desired distance along the expansion base, thereby one templet over the other. This causes a proportional movement of the other position-indicating studs, whereby the ratio of distances between points remains constant and the desired scale change is thus imparted to the stereotemplet. In most cases, the preferred locations of the stud-receiving holes, or radial centers, are at diagonally opposite corners of the rectangle defined by the model. This arrangement provides the maximum expansion base for the stereotemplet. The length of this base governs the accuracy with which the stereotemplets retain uniform scales while changing size. However, where the stereotemplet includes a fixed horizontal control point plotted on or near a line connecting the two radial centers, the radial slots for this control point define a weak or ineffective angle of intersection. In this situation it is permissible, and preferable, to locate one of the holes at another of the model corner pass point positions.

It is to be understood that two of the pass points or corners of a given model must also be selected as two of the pass points or corners in the adjacent model in the same flight. Hence, it is desirable that the images selected as pass points in the one model be sufficiently prominent or distinctive as to be readily identifiable in the adjacent model.

Thus, for example, the two right hand pass point positions in the stereotemplet of the model at the beginning of a flight correspond to the two left hand pass point positions in the stereotemplet of the adjacent model in the same flight. Similarly, the right hand positions in the second stereotemplet will correspond to the left hand pass point positions in the stereotemplet of the third model in the series, and so on for the stereotemplets of successive models in the flight.

As indicated above, stereotemplets are not limited to scale solutions along the line of flight, that is for a single flight. The scale solutions can be made just as accurately and conveniently in the direction perpendicular to the line of flight.

While it is preferable that adjoining models from two parallel flights have two common corner pass points, as in the case of adjoining models in a given flight, this is not necessary. Frequently, such alignment of models, and corresponding stereotemplets, is neither feasible nor practicable. In such cases, a corner pass point of the model from the first flight is stereoplotted as an additional pass point position on the stereotemplet for the adjacent model from the second flight and vice versa. This will provide the two common pass points required for the final assembly and scale solution.

In constructing the stereotemplet, in accordance with my invention, it is not necessary to plot the positions of nadir and/or the principal points. I prefer, however, to include the positions of principal points when the images selected as pass points are not readily identifiable. Such positions in my invention are not selected as radial centers as in the conventional slotted templet. Their function is to provide a check on the accuracy of interpretation and plotting of the pass points common to two or more successive models. This verification is established if the intersecting radial slots on each of the adjacent stereotemplets define a single position for their common principal point.

In some instances the terrain covered by a single optical model is so lacking in image detail that selection and identification of model corner pass points common to adjacent models is rendered extremely difficult, if not impossible. For such areas multiple-model stereotemplets, such as shown in Figure 3, may be used to advantage. Figure 3 shows a sterotemplet representing the horizontal plot of two successive models as a single unit. Two or three model units are preferred but more units may be included in a single stereotemplet if desired. In addition to overcoming difficulties of pass point identification, multiple-model units provide a means for increasing the physical size and strength of the stereotemplets. However, the representation of a long strip of models by a single stereotemplet would introdue the cumulative errors characteristic of stereotriangulation in place of the random errors of individually oriented models and is not recommended.

Preparations for an assembly of stereotemplets are essentially the same as those required for a layout of the conventional slotted templets. A flat and rigid supporting base is necessary. "Dyrite" or stable manuscript paper sheets, securely fastened to the base, are satisfactory materials upon which to plot the necessary grid lines, and horizontal control positions. The scale of the assembly should be equal to or larger than the intended compilation scale. Studs representing horizontal control points are secured to the base at their known coordinate values. To be of use in controlling the assembly, the images of these control points must be identifiable in the optical models and stereoplotted onto their respective templets.

The most effective pattern of the models to be used in an assembly is largely dependent upon the amount and location of the available control, and the size and shape of the project area. Where an abundance of control adds rigidity to the assembly, a considerable number of models within the area of interest may be eliminated. It is often feasible to omit intentionally models that might have an adverse influence on the scale solution. Models lacking evidence of proper level solutions and faulty models indicating instances of camera failure or film instability, would fall in this category. It is desirable to include the templets of alternate flights completely and not to exclude any flight entirely. Where horizontal control is sparse, all models containing points of known position should be included. Where control at the perimeter of a project is lacking, the assembly may be strengthened by adding the stereotemplets of models adjacent to the area.

The ability of the stereotemplets to retain scale and azimuth and to permit the extension of the scale in any direction facilitates the layout operation. Advantage of these qualities is taken by assembling the templets containing horizontal control first and then assembling the minimum number of templets that tie the control templets together. An immediate check of the reliability, the identification and the plotting of the available horizontal control as well as the proper preparation of the templets included in this network is provided. This procedure establishes early the size at which the remainder of the templets are to be assembled and thereby reduces their subsequent scale adjustment to a practical minimum. It is advisable to add the remaining templets in sequences that form successive square-shaped areas. When assembled in this manner, the stereotemplets are self-checking. A failure of templet closure is often indicative of an erroneous identification or plot of a pass point common to adjacent flights. An improperly prepared templet may be readily detected and replaced with a corrected templet. After the completion of the assembly, the determined pass point positions are pricked through the studs to the "Dyrite" or manuscript sheet.

The application of my invention to the scale solution for a 15 minute quadrangle straddling the Washington-Oregon boundary is illustrated by Figure 4. This involved four east-west flights of six-inch photography taken at a height of 36,000 feet, covering an area having ten existing horizontal control stations. Four stereotemplets were prepared from Kelsh plotter models in each of these four flights, the data being plotted at a scale of approximately 1:31,680 by means of a precision pantograph. The assembly of the stereotemplets and the subsequent compilation of planimetric detail within the quadrangle were performed at a scale of 1:31,680. Field tests revealed a maximum horizontal error of 56 feet or approximately 1/50 of an inch at the scale of assembly and compilation.

In comparison, present national map accuracy standards for published 15 minute quadrangles require that 90% of the tested positions shall check within 83 feet. To achieve even this lower standard of accuracy by methods in use prior to my invention would have required photography at considerably less height and more horizontal control than in the instant case with consequent substantially greater cost.

In Figure 4, the sixteen stereotemplets are diagrammatically represented in four strips, 51, 52, 53, and 54. Each of these strips consists of four stereotemplets corresponding to four adjacent models derived from the photographs taken in one of the four flights covering the area in question. For clarity certain details, including the pass points, on the several stereotemplets have been omitted. The ten horizontal control points, however, are represented as triangles at the appropriate points on these stereotemplets. The shaded area, Q, represents the fifteen minute quadrangle being mapped.

This system has been successfully used in areas where the flight pattern of the photography, the ruggedness and inaccessibility of the terrain, and the scarcity of existing control precluded the achievement of equally accurate solutions by other available techniques. It overcomes many of the limitations inherent in techniques that rely upon an independent scale solution for each of the pertinent flight strips, and permits considerable flexibility in the use of available equipment and personnel. Any number and various kinds of stereoplotters may be used to prepare the templets for a project area. Stereotemplets provide a convenient means of combining in one simultaneous scale solution the positional information derived from photography taken at various altitudes, with cameras of different focal lengths and from vertical, low-oblique, and high-oblique photography.

It will be appreciated from a reading of the foregoing specification that the invention herein described is susceptible of various changes and modifications without departing from the spirit and scope thereof. Accordingly, it is to be understood that the invention is to be accorded the full scope of the following claims.

I claim:

1. A stereotemplet representative of a map area, said stereotemplet consisting of a first templet element having therein a perforation defining a reference point at one corner of the optical model of said area and a plurality of slots defining other reference points including the other corners of said optical model, said slots radially aligned with said perforation, a second templet element having therein a perforation defining a reference point at one of said other corners and a plurality of slots defining the remainder of said reference points, said slots being radially aligned with said perforation, stud means slidably mounted in the said slots for conjoining said first and second elements in superimposed relationship, the superimposed slots intersecting at substantially right angles.

2. A stereotemplet for scale solution in photogrammetric mapping comprising a pair of superimposed templets representative of a map area, each of said templets having therein a plurality of apertures the center points of which correspond to selected image points in an optical model of said map area corrected for relief and tilt, whereby said apertures in the respective templets are likewise superimposed, at least four of said image points being the corners of said optical model, the aperture at one of said corner points being a stud-receiving perforation, the remainder of said apertures being in the form of slots radially aligned with said stud-receiving perforation, the stud-receiving perforation in one templet corresponding to a different corner point than the stud-receiving perforation in the other templet, the superimposed slots intersecting at substantially right angles.

3. Means for scale solution in mapping comprising at least two pairs of templets representing adjacent portions of the area being mapped, each pair of said templets having plotted thereon a plurality of selected image points including the four corners of an optical model of a portion of said map area corrected for relief and tilt, said templets being in a superimposed relationship, one of said corner image points in each templet being a stud-receiving perforation, the remainder of said image points being in the form of slots radially aligned with said stud-receiving perforation, the said slots in one templet being superimposed over the corresponding slots in the other templet of the templet pair, said slots intersecting at substantially right angles, the stud-receiving perforation in one templet corresponding to a different corner point than the stud-receiving perforation in the other templet, at least two of the selected image points in one of the pairs of templets corresponding to two of the selected image points in an adjacent pair of templets, and studs penetrating said image points in each pair of templets, said pairs overlapping at the common image points, whereby a change in the distance between any two studs in one pair of templets will produce a proportional change in distance between any two studs in the other pairs of templets, the ratio of the said two distances remaining constant.

4. A device for scale solution in photogrammetric mapping, comprising at least two adjacent pairs of templets representing adjacent portions of the area being mapped, each pair of templets consisting of a superimposed upper templet and a lower templet, each pair of templets having therein apertures corresponding to a plurality of image points including the 4 corners of the optical model of the said area, one of the said corner image apertures in the lower templet being a circular aperture, the remainder of the apertures in the said lower templet being slots radially aligned with the circular aperture, one of the said corner image apertures in the upper templet, spaced relatively differently from the one in the lower templet being circular, the remainder of the apertures in the said upper templet being slots radially aligned with the said upper templet circular aperture, whereby the said circular aperture in the lower templet and a slot in the upper templet are superimposed, and the circular aperture in the upper templet and a slot in the lower templet are likewise superimposed, and wherein the remaining slots in the upper and lower templets, respectively, corresponding to the remaining corner image points are superimposed and intersect at substantially right angles, said superimposed aperture in a pair of templets forming an aperture pair, at least two of said aperture pairs in one pair of templets corresponding to the same selected image points as the same number of aperture pairs in an adjacent pair of templets, said adjacent pairs of templets being disposed in an overlapping relationship with each other, the said corresponding aperture pairs being in superimposed relationship, studs penetrating the aperture pairs in the pairs of templets including the overlapping pairs of templets, whereby the same image points in each of the overlapping pairs of templets are represented by studs through the overlapping aperture pairs, and whereby a change in the distance between any two studs in one pair of templets will produce a proportional change in distance between any two studs in the other pairs of templets.

5. In the preparation of maps from aerial photographs, the steps comprising stereoscopically forming an optical model of a portion of the area being mapped, correcting said model for relief and tilt, stereoplotting from said corrected optical model a plurality of image points including the four corners of said model and any horizontal control points within said portion, so as to form a first templet element representative of said points and their relative positions, one of the corner image points of said first templet element being a perforation serving as a radial center and the other image points being in the form of slots radially aligned therewith, transferring the said image points from the first templet element to a second templet element whereby the second templet element duplicates the first templet element with respect to the number and position of the image points, perforating one of said corner image points in the second templet element to form a radial center, said image point being different from the image point selected for a radial center in the first templet element, conjoining said first and second templet elements at each of said image points in a superimposed but relatively slidable relationship, by fastening means passing through the said slots and perforations, whereby relative displacement of said templet elements along a line between said radial centers may take place, thereby forming a stereotemplet, and varying the scale of said stereotemplet by controlling the distance between the fastening means passing through the radial centers in the upper and lower templet elements.

6. In a method for making maps from a series of consecutive overlapping photographs of a given area, the improvement which comprises projecting the images of a pair of overlapping photographs so as to form a stereoscopic model of a unit of the area, correcting said model for relief and tilt, stereoplotting from the thus corrected model selected reference point image positions including the four corners of the model and relevant control points onto a first templet blank, pricking said positions onto a second templet blank, thereby forming a duplicate, punching a hole representing a first radial center at one of the plotted model corner image positions on said first templet blank, punching a slot radially aligned with said hole at each of the other plotted image positions to form a first templet section, punching a hole representing a second radial center in said duplicate at a different plotted model corner image point, punching a slot radially aligned with said hole at each of the other plotted image positions on said duplicate to form a second templet section, superimposing the first and second templet sections so as to bring the first radial center in registry with the corresponding slot in said second section and the second radial center in registry with the corresponding slot in said first section, inserting a stud representing the model image point through the slots and holes, thereby forming a stereotemplet in which all studs move in proper proportion to variations in distance between the studs in the radial centers.

References Cited in the file of this patent

UNITED STATES PATENTS

| | | |
|---|---|---|
| 2,102,612 | Collier | Dec. 21, 1937 |
| 2,269,896 | Kramer | Jan. 13, 1942 |
| 2,537,718 | Trorey | Jan. 9, 1951 |